INVENTOR
RONALD L. ZUBKO
BY:
ATTORNEY

INVENTOR
RONALD L. ZUBKO
BY: *James H. Rich, Jr.*
ATTORNEY

March 2, 1971  R. L. ZUBKO  3,567,252
VEHICLE FORMED BY COUPLABLE CONTAINER MEANS WITH DEMOUNTABLE
COUPLABLE ADAPTER FRAMES
Filed Dec. 12, 1968  9 Sheets-Sheet 3

INVENTOR
RONALD L. ZUBKO

BY
ATTORNEY

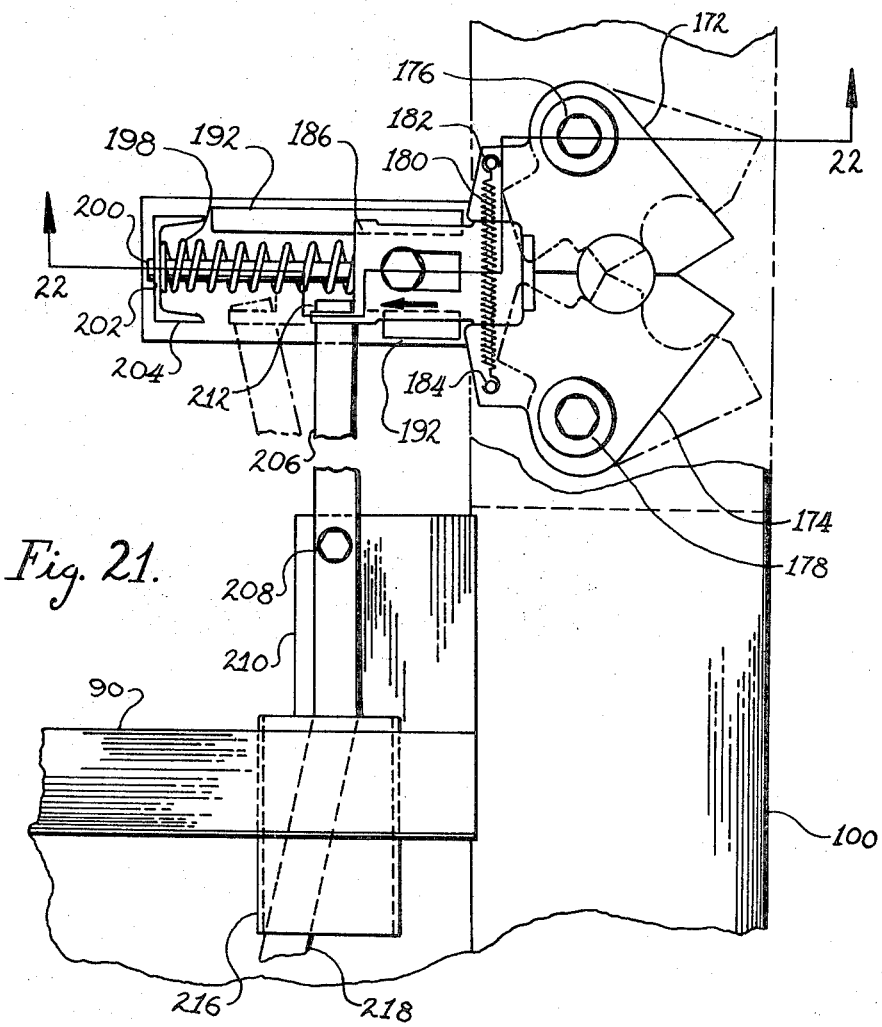
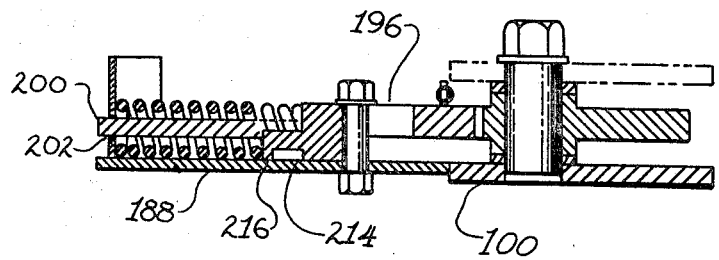

INVENTOR
RONALD L. ZUBKO
ATTORNEY

United States Patent Office

3,567,252
Patented Mar. 2, 1971

3,567,252
VEHICLE FORMED BY COUPLABLE CONTAINER MEANS WITH DEMOUNTABLE COUPLABLE ADAPTER FRAMES
Ronald L. Zubko, Levittown, Pa., assignor to Strick Corporation, Fairless Hills, Pa.
Filed Dec. 12, 1968, Ser. No. 783,380
Int. Cl. B62d 53/06
U.S. Cl. 280—415                    3 Claims

ABSTRACT OF THE DISCLOSURE

A vehicle for use in an intermodal containerized cargo system comprised of a freight carrying substantially rectangular container means vertically coupled to two adapter or chassis frames which are themselves releaseably connected together in horizontal longitudinal end-to-end relationship, a pair of wheeled bogies mounted for sliding longitudinal movement between said adapter frames, and a landing gear and a kingpin mounted on each frame in positions to allow movement of the bogies.

The adapter frames may be coupled together forming a first configuration tandem axle semi-trailer carrying a container means comprising two separate van size cargo containers in end-to-end abutting relationship, may be coupled together forming a second configuration tandem axle semi-trailer carrying a container means comprising two van size cargo containers which are themselves coupled together horizontally in end-to-end relationship to form a unitary dual container which spans both adapter frames, or may be coupled together forming a third configuration tandem axle semi-trailer carrying a container means comprising a single van size cargo container approximately equal in outside dimensions to the container means of the second configuration and spanning both adapter frames.

When the adapter frames form the first and second configurations, the adapter frames may be uncoupled and their containers separated to form two single body, single axle semi-trailers.

BACKGROUND OF THE INVENTION

The present invention relates to tandem axle semi-trailers which are convertible to separate single axle semi-trailers.

One vehicle of this type prior to the present invention may be seen in U.S. Pat. No. 3,317,219 issued May 2, 1967 and included a pair of frameless van size cargo containers each having upper and lower corner members and an adapter frame or chassis attached to said containers through their lower corner members by vertical coupling means. A single axle bogie or wheeled unit was detachably coupled to each of the adapter frames for longitudinal sliding movement therewith and a landing gear was connected to each of the frames to be operable from an extended vertical support position to a folded horizontal stored position with the frames where it was clear of the sliding movement of the bogie as it was moved longitudinally along the frame. The adapter frame also had a kingpin for attaching the semi-trailer to the fifth wheel of a towing tractor or other prime mover.

A horizontal coupling means was provided to horizontally couple the containers in longitudinal end-to-end relationship through the lower corner members of the confronting ends of the containers and a horizontal spacer means was provided to space the upper corner members of the confronting ends of the containers. While the containers were thus coupled together on their respective adapter frames in fore and aft longitudinal relationship, the landing gear of the after frame was folded to its respective horizontal storage position within the after trailer frame and the bogie on the forward frame was moved longitudinally aft to a station on the after frame, adjacent the after frame bogie, to convert the two single axle semi-trailers to a unitary dual cargo container, tandem axle semi-trailer.

The unitary dual container semi-trailer could be converted back to two single axle semi-trailers by returning the forward bogie to its original position on the forward adapter frame, lowering the after landing gear to the vertical support position and removing the horizontal couplers and spacers between the containers.

Although enjoying great success in the transportation industry, semi-trailers of the above described type had several undesirable characteristics.

A primary difficulty occurred with the design limitations of the vehicle. The adapter frames were held in their respective positions relative to each other through attachment, by vertical coupling means, to the containers. When it became desirable to remove the containers, in their horizontally coupled-together condition, as a single unit, such as by crane lifting from the adapter frames for placement of the horizontally coupled containers on a ship or other medium of transportation, the adapter frames had to be converted back to configurations which would leave them as two single axle semi-trailers in order to prevent the frames from collapsing after the containers were lifted free from the frames. The frames then had to be towed or otherwise moved away from the lifting area singly because there was no means to easily and quickly connect them together for towing. When the crane loaded the horizontally connected containers as a unit from the ship or other medium of transportation onto the frames the procedure was reversed. The loading procedure was even more difficult because the adapter frames had to be carefully aligned initially with each other at the loading area to enable them to be connected simultaneously to their respective containers as they were lowered onto the frames. The above loading and unloading procedures were time consuming and were expensive because they limited the number of containers the crane could handle within a given unit of time and delayed the loading and unloading activities in the shipping yard, thus tying up expensive labor and equipment.

A further difficulty occurred because the frames were limited to carrying two containers coupled together and could not carry a single large container which by international standards was equal in outside dimensions to the two containers coupled together. The storage capabilities on ships or other modes of transportation are usually designed to interchangeably accommodate a single large container or two smaller containers horizontally coupled together. Container fleets usually comprise coupled containers of both sizes. To accommodate both size containers, two types of tandem axle semi-trailers were needed and the capital investment and maintenance of two semi-trailer types was expensive.

A further difficulty occurred in the positioning of the landing gear on the adapter frames. Each leg of the landing gear was pivotally connected at one end to the frame and was designed to be swung laterally between the vertical support position and the raised horizontal storage position by means of manual labor. This work was physically demanding, often quickly tired the laborer and occasionally resulted in his injury.

In an attempt to overcome this difficulty, a later adapter frame, still prior to the present invention, had the landing gear legs pivotally connected to the frame to be swung longitudinally from the vertical support position rearward to a horizontal storage position within the frame. The legs were raised into the frame by the forward frame bogie contacting the legs and forcing the legs from their support position to their storage position, as the bogie was moved rearward to its station adjacent the bogie on the after frame. The legs were manually lowered when it was necessary to bring them down to the support position again. These legs were disadvantageous in that they could be damaged if the forward bogie was moved rearward too quickly or improperly.

Still another difficulty occurred with the method in which the landing gear legs were mounted to the frame. The pivotal connection between the frame and the legs required the legs to be placed at a fixed vertical support position longitudinally with respect to the frame. In order for the semi-trailers to be towed by a tandem axle tractor, the legs had to be pivotally mounted at a position which provided sufficient clearance between the rear wheels of the tractor and the landing gear. To provide this clearance, the landing gear was positioned near the longitudinal center of gravity of the adapter frame. When a single container vertically coupled to a single adapter frame contained a cargo whose center of gravity was forward of the landing gear or when the cargo in the trailer was removed from the rear of the trailer first, leaving an exceptionally heavy portion of the remaining cargo forward of the landing gear, or when a motorized forklift was driven into the trailer forward of the landing gear to remove the cargo, the front of the trailer would occasionally be forced to nose downward about the vertically positioned landing gear causing damage to the trailer, the cargo or the forklift, or injury to those persons having labor functions inside or about the immediate vicinity of the trailer.

In an attempt to overcome this difficulty a later adapter frame, prior to the present invention, had horizontal pockets located in the forward part of the frame adjacent the kingpin. The pockets contained a landing gear storable therein and which, when opened to a support position, had a horizontal outrigger extending laterally outboard of the frame to clear the rear wheels of the tractor, and a vertical leg portion pivotally connected to the outboard end of the outrigger to engage the ground for support of the trailer. These landing gear overcame the problem of nosing down of the forward end of the trailer but were expensive to manufacture, and due to the substantial fore and aft lateral forces occurring to the legs when the tractor backed against the trailer to connect the kingpin to its fifth wheel, were subject to breakage and high maintenance costs.

SUMMARY OF THE INVENTION

With the foregoing in mind a principal object of the present invention is to provide a novel vehicle which will carry two single containers coupled together horizontally forming a tandem axle semi-trailer and will allow the containers to be removed coupled together for placement on a ship or other mode of transportation without having to change the tandem axle semi-trailer into two single axle semi-trailers.

Another object of the present invention is to provide a novel vehicle which will carry either two single containers or one larger container.

A further object of the present invention is to provide a novel vehicle having landing gear which is easy to move between a stored position and a support position.

Still another object of the present invention is to provide a novel vehicle having landing gear which may be moved to a first position to allow clearance under the semi-trailer for the rear wheels of a tandem axle towing tractor and yet which may be repositioned to prevent the trailer from nosing down when the cargo is removed from the forward portion of the semi-trailer.

More specifically, an object of the present invention is to provide a novel vehicle comprising a pair of adapter frames; a single axle wheeled bogie mounted on each of the adapter frames for movement longitudinally thereof; a landing gear operatively connected to each of the frames for movement to positions which do not obstruct the movement of the bogie along the frame; means carried by the adapter frames to removably vertically couple a freight carrying, substantially rectangular container means thereon; means extending from the confronting ends of the adapter frames to rigidly couple the frames together in horizontal alignment to permit the bogies to move between the frames; and a spacing means to vary the distance between the confronting ends of the adapter frames between an extend position and a retracted position wherein the adapter frames vertically couple two separate van size cargo containers in end-to-end abutting relationship when the spacing means is in the retracted position and the frames vertically couple a single large van size cargo container or two small van size cargo containers coupled together but equal in length to the large single van size cargo container when the spacing means is in the extended position.

Still a further object of the present invention is to provide a novel vehicle which is light in weight and highly economical to manufacture and assemble, yet which is fully effective in operation and use.

Other objects and a fuller understanding of the invention may be had by referring to the following description and claims taken in conjunction with the accompanying drawings.

BRIEF DESCRIPTION OF THE DRAWINGS

FIG. 21 is a fragmentary top view with portions broken away taken along the lines 21—21 of FIG. 17;

FIG. 22 is a fragmentary sectional view taken along the lines 22—22 of FIG. 21;

DESCRIPTION OF THE PREFERRED EMBODIMENT

Figure 20:
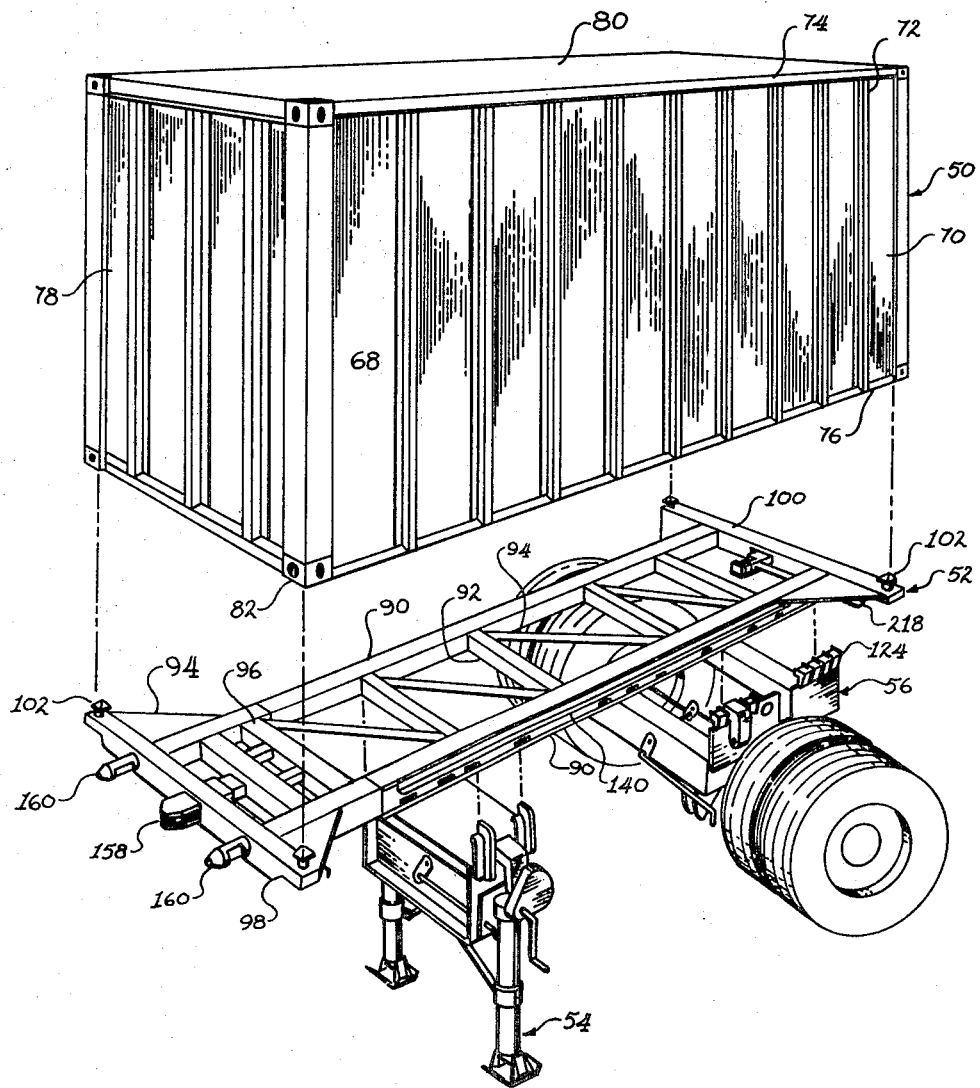
FIG. 20 is an exploded perspective view of the structure.
Figure 23:
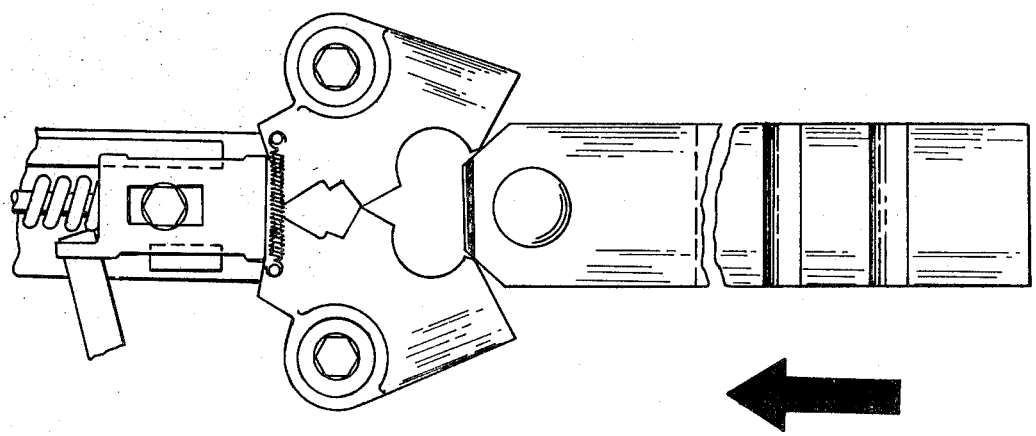
FIG. 23 is a fragmentary plan view with portions broken away showing the primary male member about to be engaged in the female members.
Figure 24:
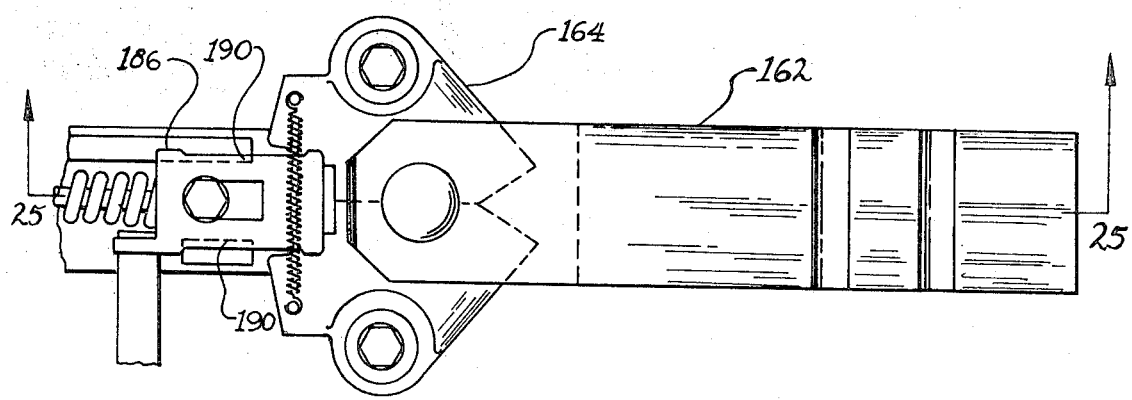
FIG. 24 is a fragmentary plan view with portions broken away showing the male member coupled in the female member.
Figure 25:
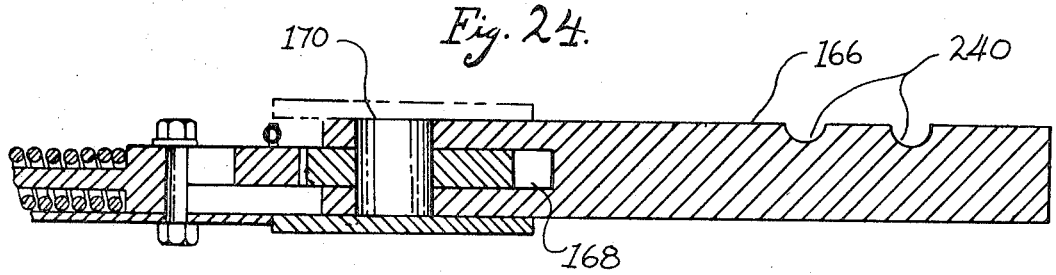
FIG. 25 is a sectional view taken along the line 25—25 of FIG. 24.
Figure 27:
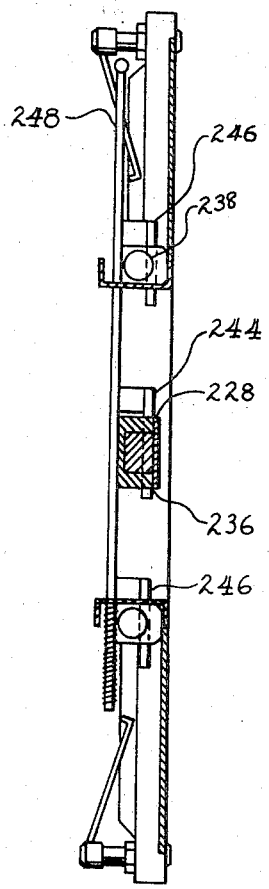
FIG. 27 is a sectional view taken along the lines 27—27 of FIG. 26.
Figure 26:
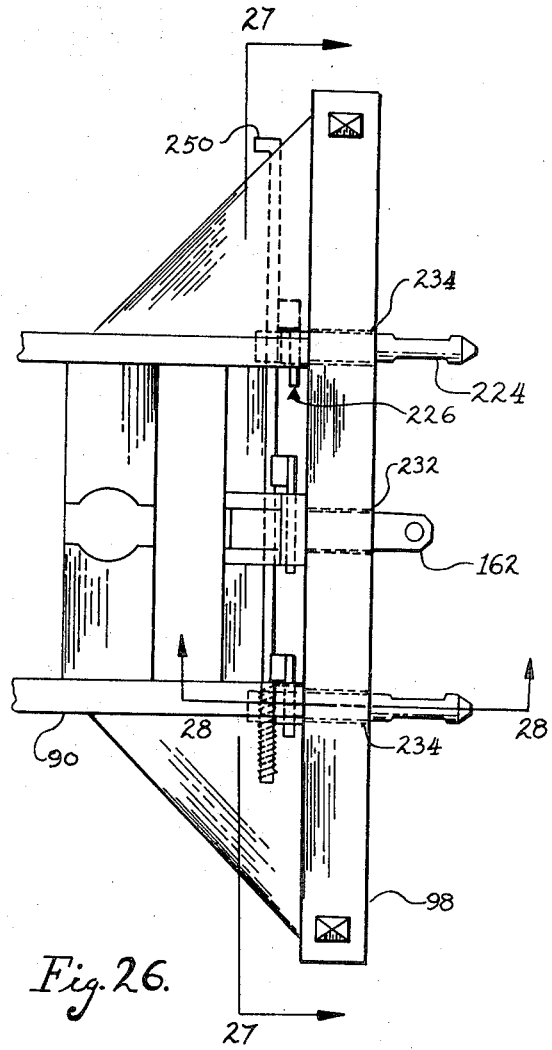
FIG. 26 is an enlarged fragmentary plan view taken along line 26—26 at FIG. 14.
Figure 28:
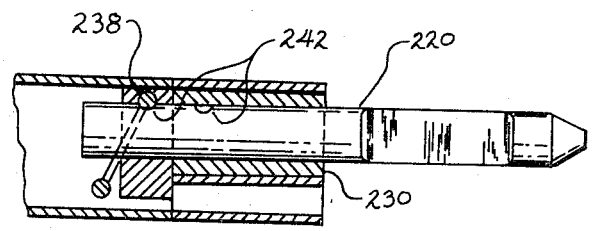
FIG. 28 is a sectional view taken along the line 28—28 of FIG. 26.

Generally, as shown in FIG. 20, the present invention comprises a vehicle having an adapter frame or chassis having a bogie or wheeled unit and a landing gear mounted for longitudinal sliding movement thereon, a kingpin mounted on the forward part thereof for attaching the frame to a fifth wheel of a tractor or prime mover, vertical coupling means to couple a van size frameless cargo container on the frame, and a horizontal coupling means to couple two frames together in longitudinally end-to-end relationship. The adapter frame may be used singly as a single axle semi-trailer or may be coupled end-to-end to a similar adapter frame to form a tandem axle semi-trailer.

The general procedure to convert two single axle semi-trailer vehicles to a tandem axle semi-trailer vehicle is shown in FIGS. 1-4 and 6-9. The vehicles are brought together in end-to-end relationship and the confronting ends of the vehicles are rigidly coupled together. In FIGS. 6-9 the containers are also coupled together in addition to the frames. After the frames are coupled together, the landing gear legs of the after trailer are retracted and the landing gear is moved manually back longitudinally along the after frame to a position immediately adjacent the after frame bogies as shown in FIGS. 2-3 and 7-8. The brakes on the bogie on the forward frame are locked and those on the bogie on the after frame are released. The forward bogie is released from its connection to the forward frame and, as shown in FIGS. 3-4 and 8-9, the tractor pulls both vehicles forward until the bogie on the forward frame is longitudinally moved aft to a position adjacent the after landing gear where it is then fixed to the after frame to form a tandem axle semi-trailer.

The procedure as described is reversed to convert the vehicle back to two single axle semi-trailers.

Figure 12:
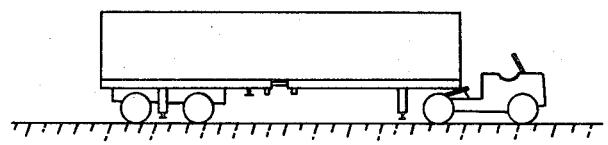
FIG. 12 is a diagrammatic side elevational view showing the apparatus carrying a single large container.
Figure 13:
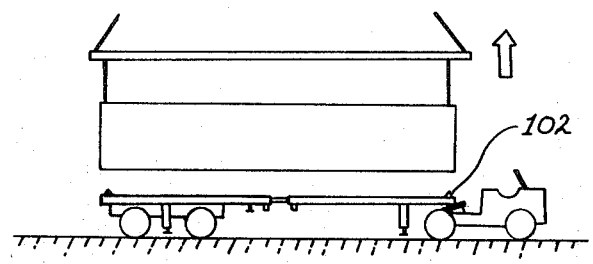
FIG. 13 is a diagrammatic side elevational view of the structure as shown in FIG. 12 showing the single large container being removed by an overhead lifting means.
Figure 14:
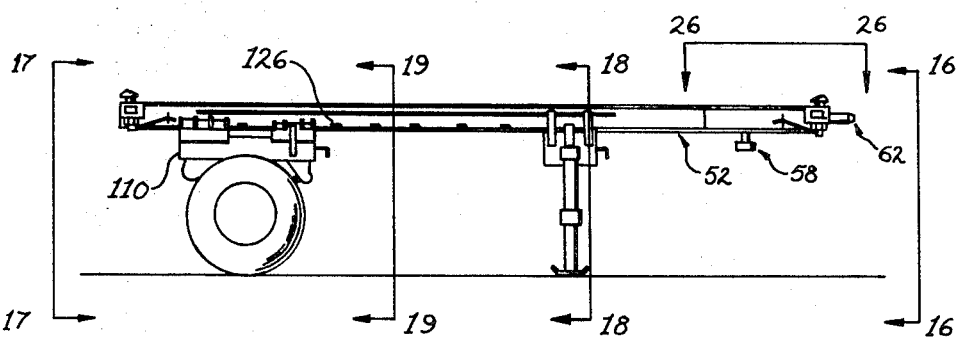
FIG. 14 is a side elevational view of a portion of the structure.
Figure 15:
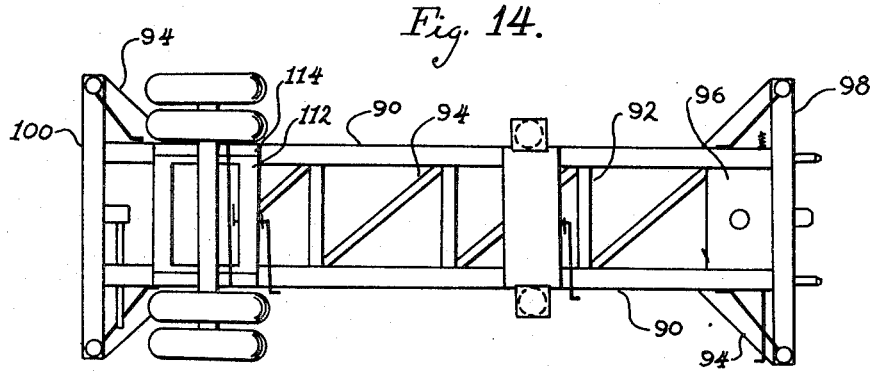
FIG. 15 is an inverted plan view of the structure shown in FIG. 14.
Figure 16:
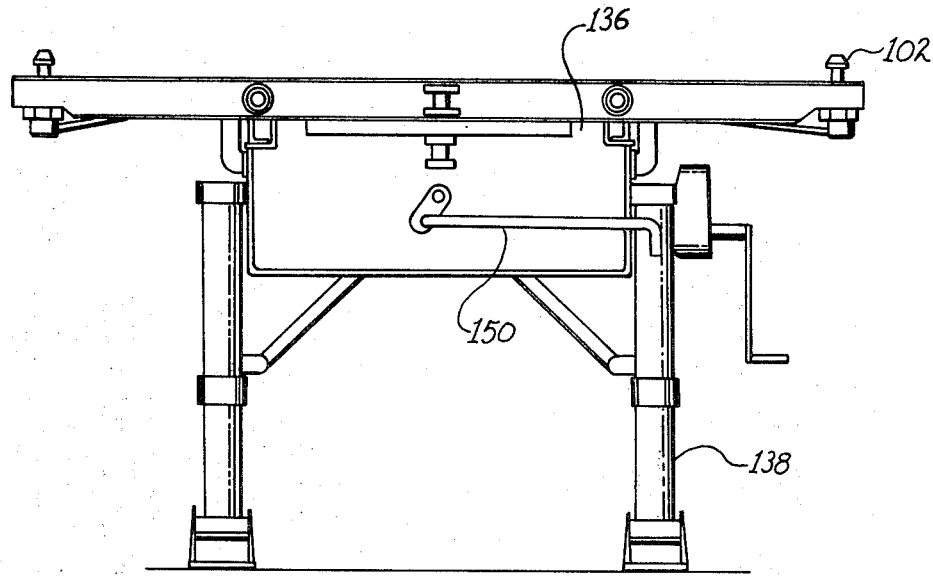
FIG. 16 is an enlarged front elevational view of the structure shown in FIG. 14.
Figure 17:
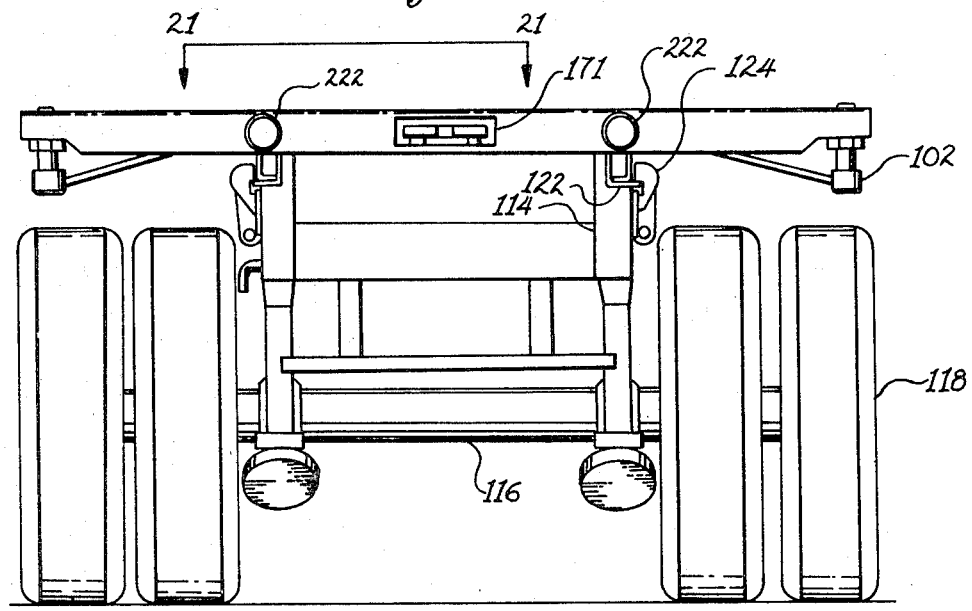
FIG. 17 is an enlarged rear elevational view of the structure shown in FIG. 14.
Figure 18:
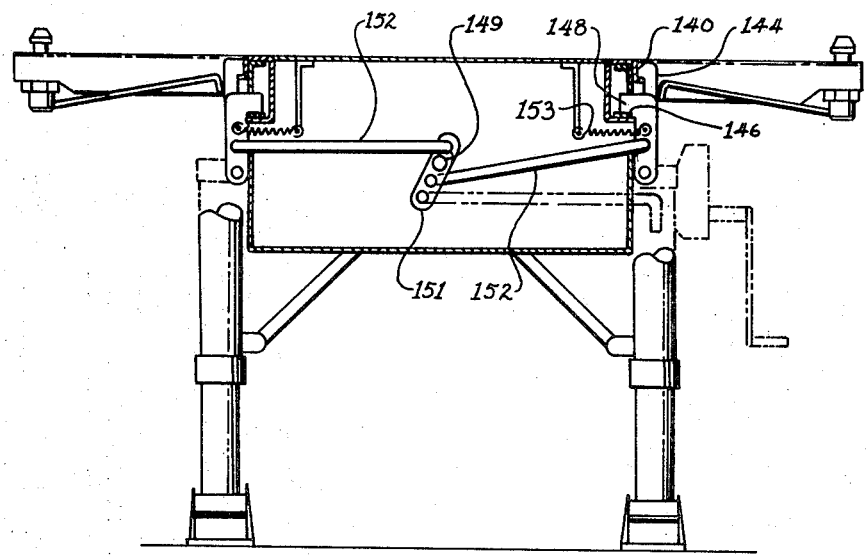
FIG. 18 is an enlarged sectional view taken along the line 18—18 of FIG. 14.

The adapter frames may be coupled together to form a first configuration tandem axle semi-trailer carrying a container means comprising two separate van size cargo containers in end-to-end abutting relationship as shown in FIGS. 1 through 5, may be coupled together to form a second configuration tandem axle semi-trailer carrying a container means comprising two van size cargo containers which are themselves coupled horizontally in end-to-end relationship to form a unitary dual container spanning both adapter frames as shown in FIGS. 6 through 11, or may be coupled together to form a third configuration tandem axle semi-trailer carrying a container means comprising a single large van size cargo container spanning both adapter frames, as shown in FIGS. 12 and 13.

Figure 1:
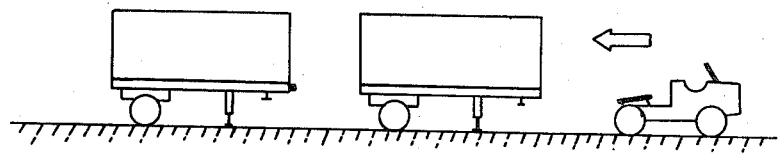
FIGS. 1–4 are diagrammatic side elevational views of the apparatus embodying the present invention and illustrating one manner of converting two single axle semi-trailers to a tandem axle semi-trailer.
Figure 2:
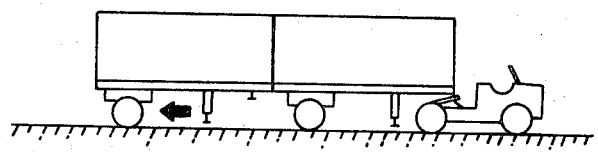
Figure 3:
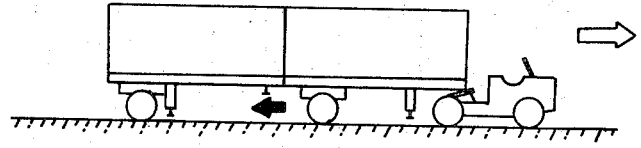
Figure 4:
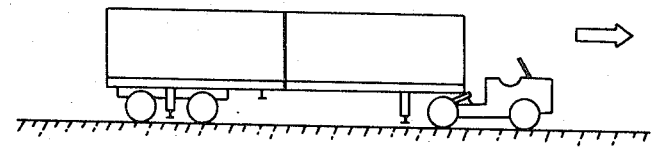
Figure 5:
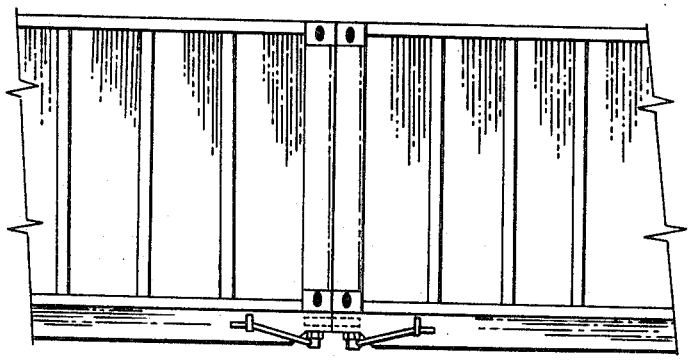
FIG. 5 is an enlarged fragmentary side elevational view of the structure shown in FIG. 4.
Figure 6:
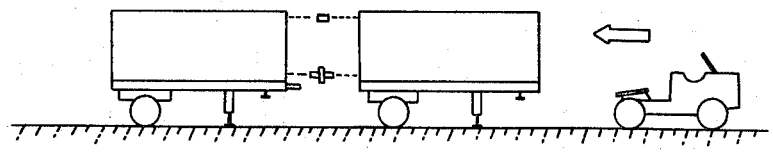
FIGS. 6–9 are diagrammatic side elevational views of the apparatus illustrating another manner of converting two single axle van size cargo bodies to a tandem axle semi-trailer.
Figure 7:
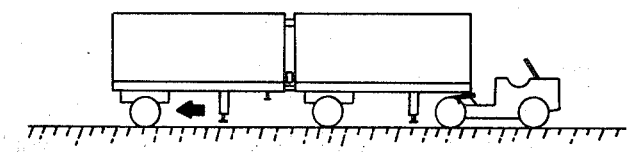
Figure 8:
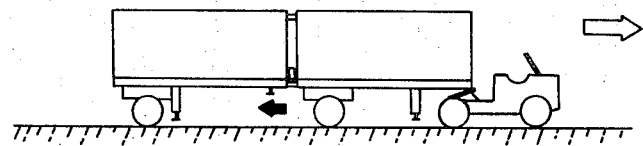
Figure 9:
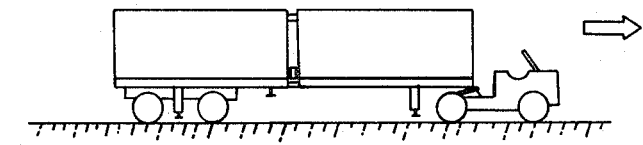
Figure 10:
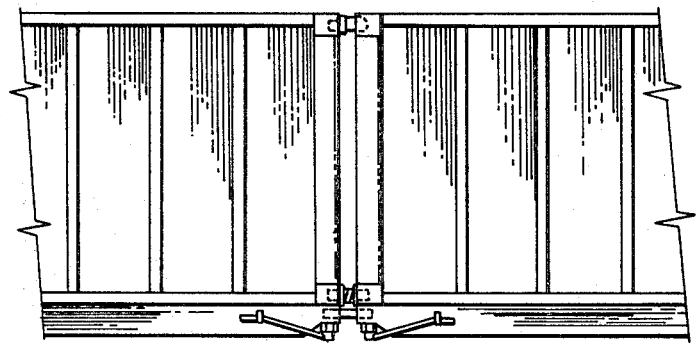
FIG. 10 is an enlarged fragmentary side elevational view of the structure shown in FIG. 9.
Figure 11:
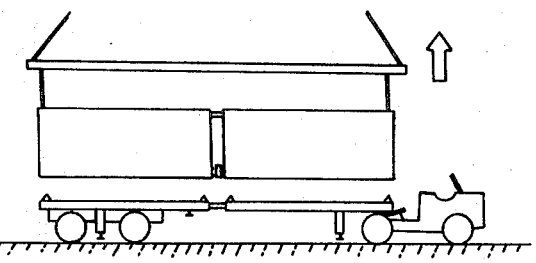
FIG. 11 is a diagrammatic side elevational view of the structure shown in FIG. 9 with the containers being removed by an overhead lifting means.

When the adapter frames form the first and second configurations the frames may be uncoupled and their cargo bodies separated to form two single body, single axle semi-trailers as shown in FIGS. 1 and 6.

In accordance with the present invention, as shown in FIGS. 14-20, a van size cargo container 50 is provided for vertical coupling to a chassis or adapter frame 52 having a landing gear 54 and a bogie or wheeled unit 56 mounted for longitudinal sliding movement therewith. A kingpin 58 is provided at the forward part of the frame 52 to enable it to be attached to the fifth wheel of a tractor or prime mover 60. Horizontal coupling means 62 are provided for coupling the frames in end-to-end longitudinal relationship to a similar frame.

More particularly, and referring to FIG. 20 it will be seen that the container 50 is provided in the form preferably of a van size cargo or trailer body and of stressed skin construction whose sidewalls 68 consist of metallic sheets in the form of panels 70 which are secured to and between vertical posts 72, the funtcion of which is to prevent buckling of the sidewalls. The panels 70 and the posts 72 are secured by appropriate means to a top longitudinal rail 74 and a bottom longitudinal rail 76. This construction is continued for the end walls 78 except that the rear end wall (not shown fully) contains the usual doors. To complete the container, which is preferably rectangular, a roof sheet 80 is secured to the top rails 74 and cross sills (not shown) are connected across the bottom rails 76 upon which a floor (not shown) is installed. In this stressed skin construction, known in the trade as frameless, a load on the floor is taken by the sidewalls 68 and the panels 70 which are an essential part of the load carrying system.

Each corner has secured structurally into the container a member or casting 82 of a construction shown and described in U.S. Pat. No. 3,363,803. It is through these corner members that the containers are removably coupled horizontally and the adapter frame or chassis 52 is coupled to the container 50.

As seen in FIGS. 14-20, the adapter frame preferably runs the full length and width of the container and comprises longitudinal side beams 90 joined by cross members 92 and diagonal members 94. Adjacent its front end the frame mounts a kingpin support member 96 which has the kingpin 58 depending therefrom.

In order to couple the container 50 on the adapter frame, the front and rear ends of the side beam 90 have a front bolster 98 and a rear bolster 100. The outboard ends of the bolsters 98 and 100 each have a vertical coupler, in this case a depressible or retractable twist lock 102 which is well known in the art and which fits in the lower corner members 82 of the container 50 to vertically couple the container 50 to the adapter frame 52. The twist locks 102 are retracted on the confronting ends of the coupled adapter frames when the frames are required to carry a single large container spanning across the frames to form a third configuration vehicle. Since there are no corner members in the middle of a large container, these twist locks are not needed.

Triangular shaped gussets 104 are provided to reinforce the outboard ends of the bolsters 98 and 100. These gussets 104 have one leg attached to the bolster and the other leg attached to the longitudinal side beam 90 and serve to strengthen the bolsters 98 and 100 against the forces imposed on the bolsters when the frames are coupled together end to end.

In order to support the frame for over-the-road movement, the bogie 56, mounted on the frame 52, consists essentially of a rectangular subframe 110 having lateral spreader members 112 joined by longitudinal side members 114. The bogie frame flexibly mounts springs on both sides thereof (not shown) which centrally mount a single transverse axle 116 which in turn mounts wheels 118 at its end. The bogie is, of course, provided with a brake mechanism and hose connections to the emergency and service lines of the tractor, as is well known in the art.

Figure 19:
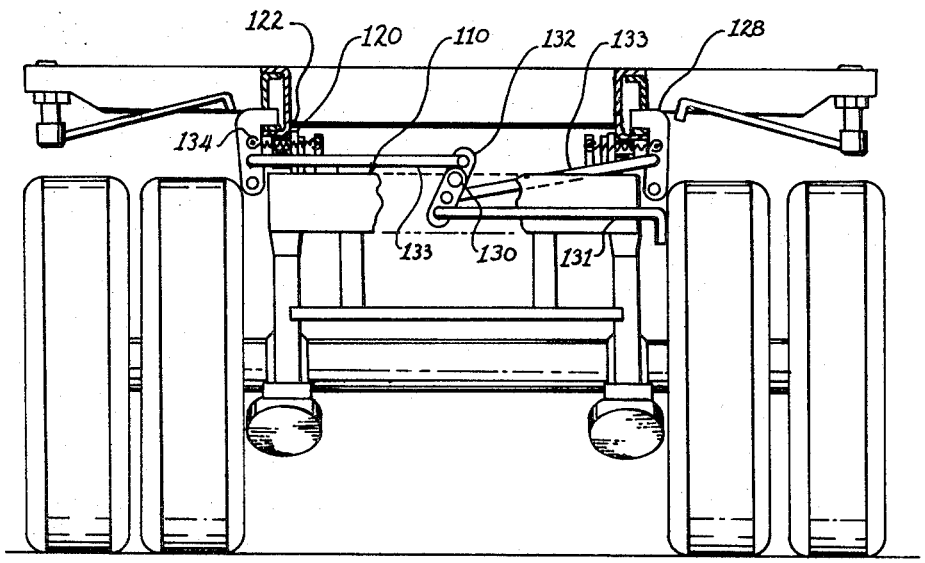
FIG. 19 is an enlarged sectional view taken along the line 19—19 of FIG. 14.

To mount the bogie 56 for longitudinal sliding movement on the frame 52, a bogie mounting means is provided. In this case, the bogie mounting means comprises, as shown in FIG. 19, a pair of rollers 120 mounted on each side of the subframe 110 adjacent the subframe corners to bear on the lower foot portion 122 of their respective longitudinal side beams 90 of the frame 52, and a pair of bogie retaining dogs 124 affixed by welding or other suitable means to the outside walls of the longitudinal side members 114 adjacent the beams 90 to grasp the foot portion 122 of the side beams 90. Eeach roller bears against its respective portion of the foot 122 to support the weight of the frame 52 for longitudinal sliding movement and the retaining dog 124 prevents the subframe 110 from separating from the frame 52. The bogie mounting means allows the bogie to be moved along the entire length of the beam 90. When two adapter frames are coupled together in end-to-end relationship, the beams 90 of the frames are longitudinally aligned and the bogie may be moved from one adapter frame to the other along their respective side beams 90.

In order to fixedly station the bogie along the adapter frame 52, a bogie locking or coupling means is provided. In the present instance the bogie locking or coupling means comprises longitudinally spaced apertures 126 in the beams 90 and a locking pawl 128 pivotally mounted on each of the bogie subframe side members 114 which engage the apertures 126 to fixedly station the bogie along the adapter frame 52. The apertures are in transverse alignment with each other on each side of the adapter frame 52 and the pawls located in transverse alignment on the subframe side members 114 engage the apertures to fixedly station the bogie along the adapter frame 52. When the locking pawls are in the locked position they extend through selected apertures 126 in the beams 90 and thus couple the bogie to the adapter frame in adjusted positions. When the locking pawls are retracted from the apertures, the bogie is free to slide longitudinally beneath the adapter frame. In this case the means to operate the locking pawls 128 consists simply of a shaft 130 rotatably mounted centrally of the bogie subframe 110 on the lateral spreader 112 with a suitable handle 131 at one end thereof. A bell crank 132 is secured to the shaft to which are terminally pivoted transversely extending links 133 which are in turn operatively connected to the pawls 128. Springs 134 urge the pawls to the locked position.

In order to support the forward part of the adapter frame when it is disengaged from the tractor or another adapter frame, the landing gear 54 is provided. In this instance the landing gear has a boxlike body 136 to which are attached retractable support legs 138 which are well known in the art.

To mount the landing gear 54 on the frame 52, each beam 90 has a track angle 140 affixed to the beam 90 by welding or other suitable means and extending horizontally outward therefrom along a predetermined length to the rear of the frame 52. A pair of landing gear retaining dogs 144 are affixed to each side of the body 136 and have shoulders 146 which engage the track angle 140 to slideably fasten the landing gear 54 to the frame 52.

To fixedly station the landing gear 54 along the chassis 52, a landing gear locking or coupling means is provided. In the present instance the locking or coupling means is similar to the bogie locking or coupling means and comprises landing gear pawls 148 pivotally mounted on each side of the body 136 in transverse alignment and positioned to allow the shoulders 146 to extend laterally through the apertures 126 in the beams 90. When the shoulders 146 are extended through the apertures 126, the landing gear is coupled to the adapter frame 52. When the shoulders 146 of the locking pawls 148 are retracted from the apertures, the landing gear is free to slide beneath the adapter frame along the length of the track angles 140. The means to operate the landing locking pawls is similar to the means to operate the bogie locking pawls. It consists simply of a shaft 149 rotatably mounted centrally of the landing gear body 136 with a suitable handle 150 at one end thereof. A bell crank 151 is secured to the shaft 149 to which are terminally pivoted transversely extending links 152 which are operatively connected to the pawls 148. Springs 153 urge the pawls 148 to the locked position.

In operation, when the landing gear 54 is not supporting the adapter frame 52, the legs 138 may be vertically raised from their support position, the locking pawls 148 removed from the apertures 126 in the beams 90, and the landing gear moved longitudinally along the track angle between a stored position immediately adjacent the bogie 54 and a support position adjacent any preselected aperture 126 in the forward part of the frame 52. It is to be noted that the landing gear may be positioned well forward on the frame 52 adjacent the first set of apertures to support the chassis forward of its longitudinal center of gravity and thus prevent the frame 52 from nosing downward over the landing gear when the container 50 mounted on the frame 52 has a cargo whose center of gravity is located forward in the container or when the cargo in the container was removed from the rear portion of the container first, leaving an exceptionally heavy portion of the remaining cargo forward in the container.

When the frame 52 is to be towed by a tandem axle tractor, the landing gear 54 may be moved longitudinally back along the frame to a position adjacent a preselected set of apertures to provide clearance between the rear wheels of the tractor and the landing gear.

In accordance with one feature of the invention, in order to couple the frame in a longitudinal end-to-end relationship to a similar frame, a frame coupling means 62 is provided. In this case the frame coupling means 62 comprises a frame connecting means 158 and a frame alignment means 160.

In the present instance the frame connecting means 158 for coupling the frames together comprises a primary male member 162 which is fixed on the forward end of the frame 52, in this case on the front bolster 98 and extending forwardly therefrom, and a female locking member 164 which is fixed on the rear end of the frame 52, in this case on the rear bolster 100. The female locking member on a first and forward frame receives the male member 162 on a second and rear frame in locking relationship to connect the two frames together.

More specifically, as shown in FIGS. 20 and 23–26, the male member has an elongated rectangular cross sectioned body 166 having a bifurcated portion 168 at a first end. A pin 170 is mounted vertically between the bifurcated portion 168. The rear bolster 100 of the frame has an elongated opening 171 therein and the female locking member 164 is mounted within the opening 171. As shown in FIGS. 17 and 21–25, the female locking member 164 has a pair of jaws 172 and 174 which embrace the pin 170 when locking occurs. The jaws 172 and 174 pivot about pins 176 and 178 and are urged into the open or unlocked position by a coil spring 180 mounted between projections 182 and 184 on the jaws 172 and 174 respectively. The jaws may be seen in FIG. 23 in their open unlocked position ready to receive the pin 170 and in FIGS. 24 and 25 in their closed locked position embracing the pin in locking relationship.

In order to latch the jaws 172 and 174 in the closed or locked position a latch member 186 is provided to fit between the projection 182 and 184 to latch the jaws closed. The latch member 186 is slideably mounted on a plate 188 which is mounted on the front of the rear bolster 100 adjacent the opening 171. The latch member 186 has a pair of keyways 190 shown in FIG. 24 as dotted lines which correspond to a pair of keys 192 on the plate 188. A pin 194 passes through an elongated slot 196 in the latch member 186 to hold it for sliding movement on the plate along the keys 192. The latch member is biased toward the latched position between the projections 182 and 184 by a coil spring 198 which is mounted about a column 200 extending from the forward part of the latch member. The column 200 passes through a hole 202 in a U-shaped stop guide 204 vertically mounted on the plate 188, and the spring 198 acts between the stop guide 204 and the latch member 186 to bias the latch member from an unlatched position, when it is withdrawn from between the projections 182 and 184, to a latched position between the projections 182 and 184 which locks the jaws 172 and 174. A latch member activation bar 206 is pivotally mounted at 208 on a bracket 210 attached to the rear bolster 100. The bar 206 has a tongue 212 at one end which passes through an aperture 214 in a shoulder portion 216A of the latch member 186. The other end of the activation bar 206 passes through a hole 216B in the beam 90 to form a handle 218 as shown in FIG. 20

In operation of the chassis coupling means 158, the rear end of a first or forward trailer is backed against the forward end of a second or rear trailer to enable the primary male member 162 of the second trailer to pass through the opening 171 in the rear bolster of the first trailer. The pin 170 of the primary male member 162 passes between the open jaws 172 and 174 forcing the jaws closed about the pin and allowing the latcher member 186 to be moved by the force of the spring 198, to a latch position between the projections 182 and 184, thus latching the jaws in the closed or locked position.

To uncouple the trailers an operator moves the handle 218 rearward to cause the latch member 186 to be withdrawn from between the projections 182 and 184, thus unlatching the jaws 172 and 174. The trailers are then separated withdrawing the male member 162 from the female member 164.

In the present instance the frame alignment means 160 comprise two pins 220 mounted at a first end to the front bolster 98 adjacent the beams 90 and projecting longitudinally forward from the frame and a pair of receiving orifices 222 in the rear bolster 100 to receive the second end of the pins 220 of a similar frame. When the rear of a first and forward frame is moved against the front end of a second and rear frame, the pins 220 fit within the orifices 222 to align the frames together to assure longitudinal alignment of the side beams 90 to allow the bogies to be moved from one frame to another. The pins 220 also coact with the orifices 222 to take the shear forces between the frames and thus eliminate shear forces from occurring between the male member 162 and the female member 164.

To provide for a collecting action which will align the frames which are moved toward each other for coupling and which are slightly out of alignment, the outer or second ends of the pins are formed into conical frustums. The conical frustums coact with the edge of the orifices 220, urge the pins into a common center line with the orifices and thus align the frames during coupling.

To allow a small predetermined amount of relative lateral movement between the chassis to enable the male and female members to achieve a locked position, vertical indentations 224 are provided about the midportions of the pins 220. When the pins 220 are fitted within the orifices 222 the indentations allow enough relative movement between the frames to properly position the male member 162 for locking between the jaws 172 and 174. The indentations are sized to prevent the relative lateral movement of the frames from preventing the bogies from sliding from one frame to another.

In operation the rear of a first trailer is moved against the front end of a second trailer to enable the conical surfaces of the pins to engage the outer edges of the orifices 222. As the first trailer is further moved against the second trailer the conical surfaces acting on the orifices 220 force the chassis into an alignment allowing the pins 220 to further proceed into the orifices 222. When the pins have engaged the orifices 222 to a depth wherein the vertical indentations 224 on the pins are adjacent the walls of the orifices 222, the indentations 224 permit a lateral relative movement between the frames which in turn permits lateral movement of the male member while seeking a position within the female member for locking.

In accordance with a feature of the invention, in over-the-road operation the vehicle is usually formed into a first configuration as shown in FIGS. 1–5, carrying two small standard size containers one each vertically coupled to a frame. In this configuration the adapter frame coupling means 62 couples the frames 52 closely together to allow the confronting ends of the containers to meet in abutting relationship wherein the upper corner members of the confronting ends of the containers transmit compression between the containers and the coupling means 62 transmits tension and shear forces between the frames to produce a unitary structure. The formation of this unitary structure enables the adapter frames 52 to be of lightweight construction yet still carry the heavy loads which are standard in the containers.

When the adapter frames are coupled together to carry two small standard size containers which are themselves in turn coupled together forming a second configuration vehicle as shown in FIGS. 6–11 or when the adapter frames are coupled together to carry one large standard size container as shown in FIGS. 12 and 13, a small space of approximately three inches must be provided between the adapter frames to provide for the increased length of the containers over the first configuration wherein the containers are joined end-to-end in abutting relationship.

To provide for the increased separation between the frames a spacing means is provided. In the present instance, the spacing means comprises means 226 to vary the length of the coupling means. In this case the male member 162 and the pins 220 may be moved between a predetermined extended and retracted position. As shown in FIGS. 23–28 the male member 152 and the pins 220 each are mounted in a housing 228 and 230 having inside walls which closely conform to the cross section of the respective male member and pins. The housings 228 and 230 are mounted on the rear wall of the front bolster 98 and the male member and pins pass through passageways 232 and 234 respectively in the front bolster and extend forwardly therefrom.

Each housing 228 and 230 has in its inside top wall a recessed portion 236 and 238 respectively. The male member and pins each have a pair of similar recessed portions 240 and 242 on their body portions. When one of the recessed portions 240 and 242 are aligned with the recessed portions 236 and 238 of the housing, lock members 244 and 246 fit within the aligned recessed portions to lock the male member 162 and pins 220 in place. The recessed portions on the male member and pins are positioned to allow the member and pins to be locked in either the retracted position for coupling the frames to form a first configuration vehicle or the extended position for coupling the frames to form a second or third configuration vehicle.

The lock members 244 and 246 are attached to an actuation bar 248 having a handle 250. In operation the bar 248 is moved outward from the frame to remove the lock members from the housings 228 and 230 and the male member and pins are moved manually between the extended and retracted positions.

From the foregoing description it can be seen that the frames can carry two single containers coupled together horizontally and allow them to be removed coupled together for placement on a ship or other medium of transportation. The adapter frames can remain in their tandem axle semi-trailer configuration and can be removed from the load area as a single unit.

It can also be seen from the foregoing description that the chassis will carry either two small standard containers or one large standard container.

Further, from the foregoing description it can be seen that the landing gear may be easily moved between a stored and support position and may be positioned on the frame to allow clearance under the frame for the rear wheels of a tandem axle tractor to be connected for towing the frames yet repositioned to prevent the vehicle from nosing down when the load in the vehicle is forward of center of gravity of vehicle.

While a particular embodiment of the present invention has been herein illustrated and described, it is not intended to limit the invention to such disclosure, but

What is claimed is:
1. A vehicle comprising:
    (a) a pair of adapter frames;
    (b) a single axle wheeled bogie mounted on each of said adapted frames for movement longitudinally thereof;
    (c) a landing gear operatively connected to each of said frames for movement to positions which do not obstruct the movement of said bogie along said frames;
    (d) means carried by said adapter frames to removably vertically couple a freight-carrying substantially rectangular container means thereon, said container means having upper and lower corner members and at least each of said lower corner members including a vertical and horizontal wall, a recess behind said walls and slots opening through said walls and communicating with said recess, said means to vertically couple said container, means extending removably through said slots in said horizontal walls of said lower corner members and into said recesses to couple said adapter frames;
    (e) means extending from the confronting ends of said adapter frames for releasably connecting said adapter frames rigidly together in horizontal alignment to permit said bogies to move between said frames; and
    (f) a spacing means to vary the distance between the confronting ends of said adapter frames between an extended position and a retracted position, said vehicle adapted when in said extended position to vertically couple a container means comprising a unitary van size cargo container structure spanning across both said adapter frames, and adapted when in said retracted position to vertically couple a container means comprising two single van size cargo containers, said single cargo containers each being vertically coupled to a respective frame and positioned in abutting end to end relationship.

2. A vehicle as set forth in claim 1, wherein said spacing means comprises:
    (a) at least one male member attached at one end to one of said adapter frames and projecting outwardly therefrom, and having a bifurcated portion at the other end;
    (b) a vertically disposed pin carried within the bifurcated end portion of said male member;
    (c) a pair of jaws mounted in opposing relationship to said male member and attached to the other of said adapter frames;
    (d) said jaws adapted to engage said pin when said two frames are moved into abutting relationship, the engagement of said pin closing said jaws to embrace the pins;
    (e) a pair of projections at the other end of said jaws opposing the end embracing said pin;
    (f) a spring-loaded latch member adapted to move between said projections when said jaws are closed to immobilize said jaws;
    (g) latch member activation means connected to said spring-loaded member to remove said spring-loaded member from between said projections against the force of said spring; and
    (h) a second spring connected to said jaws to hold said jaws in the open position after said latch member has been removed.

3. An adapter frame adapted to be mounted in tandem with a second adapter frame and to support a pair of twenty-foot containers or a single forty-foot container when the adapter frames are in the coupled, tandem condition, said adapter frame comprising:
    (a) connecting means mounted in each corner of the adapted frame to vertically secure to the adapter frame a container mounted thereon;
    (b) a pair of male engaging members mounted at one end of the adapter frame and extending outwardly from said one end;
    (c) means mounting said male engaging members for movement between two positions, in one of which positions the engaging member extends farther outwardly from said adapter frame than in the other of said positions, whereby a pair of adapter frames could be coupled together to form a unit having one of two predetermined lengths, depending upon the position of the male members;
    (d) a pair of female locking members mounted at the other end of said adapter frame in alignment with said male locking members and adapted to lockingly receive the adjacent male locking members of a similar adapter frame, whereby a pair of interlocked adapter frames form a rigid unit;
    (e) landing gear retractably mounted on the bottom of the said adapter frame and retractable to a nesting position within said adapter frame; and
    (f) bogie slide means mounted at the bottom of the adapter frame and extending along the length thereof, and adapted to permit movement of a bogie mounted to said adapter frame from one end of the adapter frame to the other end of the adapter frame and to permit said bogie to be lockingly mounted in any one of several positions along the longitudinal axis of the adapter frame.

References Cited

UNITED STATES PATENTS

| | | | |
|---|---|---|---|
| 3,102,738 | 9/1963 | De Roshia | 280—415 |
| 3,105,703 | 10/1963 | Rittenhouse | 280—415 |
| 3,163,442 | 12/1964 | Bertolini | 280—104.5 |
| 3,288,492 | 11/1966 | Stricker et al. | 280—415 |
| 3,317,219 | 5/1967 | Hindin et al. | 280—415 |
| 3,321,214 | 5/1967 | Tantlinger | 280—423 |
| 3,363,803 | 1/1968 | Abolins | 220—23.4 |
| 3,413,016 | 11/1968 | Bertolini | 280—415 |
| 3,402,943 | 9/1968 | Martin | 280—423X |

LEO FRIAGLIA, Primary Examiner

U.S. Cl. X.R.
280—34; 296—35